(12) United States Patent
Cohen et al.

(10) Patent No.: US 11,443,126 B2
(45) Date of Patent: Sep. 13, 2022

(54) BAGGAGE HANDLING VERIFICATION DEVICE AND METHOD

(71) Applicant: Ramo Holdings Pty Ltd., St. Peters (AU)

(72) Inventors: Kevin Cohen, St. Peters (AU); Mark Beacroft, St. Peters (AU); Patrick Moulds, St. Peters (AU)

(73) Assignee: RAMP HOLDINGS PTY LTD., St. Peters (AU)

( * ) Notice: Subject to any disclaimer, the term of this patent is extended or adjusted under 35 U.S.C. 154(b) by 0 days.

(21) Appl. No.: 17/134,568

(22) Filed: Dec. 28, 2020

(65) Prior Publication Data
US 2021/0200968 A1    Jul. 1, 2021

(30) Foreign Application Priority Data
Dec. 28, 2019  (AU) ................................ 2019904959

(51) Int. Cl.
*G06K 7/10*  (2006.01)
*G06K 19/077*  (2006.01)

(52) U.S. Cl.
CPC ... *G06K 7/10366* (2013.01); *G06K 19/07758* (2013.01)

(58) Field of Classification Search
CPC .................... G06K 7/10366; G06K 19/07758

USPC .......................................................... 235/451
See application file for complete search history.

(56) References Cited

U.S. PATENT DOCUMENTS

| | | | |
|---|---|---|---|
| 2005/0258230 A1* | 11/2005 | Wiater .................. | G06Q 10/08 235/375 |
| 2017/0004444 A1* | 1/2017 | Krasko ............. | G06Q 10/0833 |
| 2017/0249507 A1* | 8/2017 | King .................... | G06K 7/1404 |
| 2018/0218320 A1* | 8/2018 | Lee .................... | G06K 17/0029 |
| 2019/0197273 A1* | 6/2019 | Mazzone ............. | G06K 7/1417 |
| 2020/0410801 A1* | 12/2020 | Rahilly .................. | G07F 17/12 |
| 2021/0272037 A1* | 9/2021 | Hanebeck ............... | H04W 4/35 |
| 2021/0307733 A1* | 10/2021 | Wang ...................... | A61B 10/02 |
| 2021/0350319 A1* | 11/2021 | Park .................. | G06Q 10/0838 |
| 2021/0357447 A1* | 11/2021 | McKenzie .......... | G06F 16/9038 |

* cited by examiner

*Primary Examiner* — Allyson N Trail

(57) ABSTRACT

A baggage handling verification device (10) is disclosed for use with baggage (46) having an RFID tag (48) attached. The device includes a user interface to emit signals, an attachment element (22, 28) to attach the device to a user, an RFID antenna (32), and RFID reader (34) to read data received by the antenna from the tag. Data memory (42) stores data pertaining to a passenger journey. A CPU (38) can compare data from the tag with data in the memory. The device can emit different signals depending on whether the compared data matches or not to assist the user to decide how to handle the baggage. The invention extends to a method of determining whether an intended action relating baggage matches a predetermined desired action for that baggage, and to a baggage handling checking device.

12 Claims, 2 Drawing Sheets

BAGGAGE HANDLING VERIFICATION DEVICE AND METHOD

FIELD OF THE INVENTION

This invention relates to a baggage handling verification device for use with baggage to which is attached a radio-frequency identification (RFID) baggage tag containing tag data, and to a method involving use of the device.

The method is for determining whether an intended action relating to an item of baggage matches a predetermined desired action relating to that baggage item, and may be used for this purpose.

BACKGROUND TO THE INVENTION

Due to the large volume of passenger baggage handled at airports across the globe, misdirection and loss of baggage is a common problem. Lost items of baggage are often located and returned to their owners, but the temporary loss of the baggage can cause passengers great inconvenience and stress. The problem of lost baggage is all the worse when the baggage cannot be located at all.

Apart from the disadvantages of this issue to the passengers, it can also result in significant costs to airlines and airports and other locations where passenger baggage is handled, not only in lost time, but also as a result of claims for compensation made by passengers whose baggage is lost.

It is known to use scanning devices to check details of baggage from tags or other data storage items applied or attached to items of baggage. Indeed, one specific example of such devices involves the use of RFID tags that are attached to items of baggage and RFID reader devices that can interrogate the tags to determine relevant details such as departure and destination ports of the baggage, whether the baggage has a particular status applied to it such as baggage that is to be handled as premium baggage, details of baggage owners, and so on.

Such RFID readers are often portable and can be held by baggage handlers and positioned to scan RFID tags on baggage. However, given the typical weight of baggage, each time a baggage handler uses such a device to obtain relevant data from a piece of baggage, the handler will have to put the scanner down (often on a scanner cradle, stand or the like) in order for the baggage handler's hands to be freed up to lift and move the baggage as required. The repeated need to retrieve such a scanner for use and then to put it down after use as described is not only inconvenient for baggage handlers but can add significantly to the overall time required to handle such baggage especially where large volumes of baggage are involved.

In addition, such scanners are typically connected to display devices such as monitors or mobile phones which are adapted to display information read from the RFID tags together with other information relating, for example, to desired destinations of the baggage, levels of priority with which the baggage is to be handled, and so on. Each time a baggage handler scans an RFID tag on an item of baggage, the hander will need to consult and read the information shown on the display to check and confirm that the baggage is about to be handled in the appropriate manner. This, too, can give rise to great inconvenience for baggage handlers and can add further to the time required to handle such baggage.

It is an object of the present invention to overcome or ameliorate disadvantages of the prior art or to provide a useful alternative thereto.

SUMMARY OF THE INVENTION

According to a first aspect of the invention there is provided a baggage handling verification device for use with baggage to which is fixed an RFID baggage tag containing data, the device including:

a device user interface adapted to emit user-detectable signals;

at least one device attachment element adapted to releasably attach the device to a part of the body, other than the hands, of a user of the device;

an RFID signal receiving antenna;

an RFID reader adapted to read data received by the antenna from the tag, that data representing first information;

data memory that stores data representing second information pertaining to a predetermined passenger journey; and a CPU adapted to compare the first information represented by data read by the RFID reader with the second information stored in the data memory, to determine if the compared first information and second information match each other, to cause the user interface to emit at least one first predetermined user-detectable signal indicative of the compared first information and second information matching each other, and to cause the user interface to emit at least one second predetermined user-detectable signal indicative of the compared first information and second information not matching each other.

In a preferred embodiment of the invention, the at least one device attachment element includes an arm strap adapted for attachment of the device to the user's arm.

In a preferred embodiment of the invention, the device user interface includes a display screen.

Then, preferably, the user-detectable signals include a plurality of differently colored visible signals.

Preferably in that case, the at least one first predetermined user-detectable signal includes lighting of a first color, preferably green, and the second at least one predetermined user-detectable signal includes lighting of a second color, preferably red.

In a preferred embodiment of the invention, the user interface includes a vibration generator adapted to cause the device to vibrate.

Preferably, the user-detectable signals include text symbols.

In a preferred embodiment of the invention, the device includes a wireless signal reader, preferably that functions according to the Bluetooth™ standard, for reading the data representing the second information, from a separate data source.

In this case, the device preferably includes a software application for manipulating said data read from the separate data source. Preferably the software application is adapted for manipulating said data read from the separate data source, where that data has been received from said separate data source according to the Bluetooth™ Standard.

According to a second aspect of the invention there is provided a method of determining whether an intended action relating to an item of baggage matches a predetermined desired action relating to that baggage item, the method including:

determining an intended action relating to the baggage item;

providing a baggage handling verification device according to the first aspect of the invention;

releasably attaching the device to the body of a device user with the at least one device attachment element such that the device is attached to a part of the body other than the hands of the user;

providing the baggage item, wherein an RFID baggage tag containing data representing first information is attached to the baggage item;

causing the RFID signal receiving antenna to receive, from the tag, said data representing first information;

causing the RFID reader to read the data representing first information, received by the antenna from the tag;

causing the CPU
      to compare said first information represented by data read by the RFID reader with the second information represented by the data stored in the data memory,
      to determine if the compared first information and second information match each other,
      to cause the user interface to emit at least one first predetermined user-detectable signal if the compared first information and second information match each other, and
      to cause the user interface to emit at least one second predetermined user-detectable signal, different to the first predetermined user-detectable signal, if the compared first information and second information do not match each other; and carrying out the intended action relating to the baggage item if the user interface emits the at least one first predetermined user-detectable signal; and carrying out another action if the user interface emits the at least one second predetermined user-detectable signal.

In a preferred embodiment of the invention, said step of causing the CPU is effected, at least partially, by moving the device into proximity to the tag.

According to a third aspect of the invention there is provided a baggage handling checking device for use with baggage to which is fixed an RFID baggage tag containing data, the device including:

a device user interface adapted to emit user-detectable signals;

at least one device attachment element adapted to releasably attach the device to a part of the body, other than the hands, of a user of the device;

an RFID signal receiving antenna;

an RFID reader adapted to read data received by the antenna from the tag, that data representing at least an identifier of the tag;

a wireless transmitter adapted to transmit data to a remote receiver said transmitted data representing at least said identifier;

a wireless receiver adapted to receive data from a remote transmitter in response said transmission of data to said remote receiver; and a CPU adapted to cause the user interface to emit a user-detectable signal based on data received by the wireless receiver from the remote transmitter.

Where reference is made herein to the tag being attached to baggage, this includes a case where the tag is incorporated into, or is otherwise integrally connected to, or forms an integral part of, the baggage.

BRIEF DESCRIPTION OF THE DRAWINGS

Preferred embodiments embodiment of the invention will now be described, by way of example only, with reference to the accompanying drawings in which.

DETAILED DESCRIPTION

Referring to the drawings there is provided a baggage handling verification device 10. The device 10 includes a base component 12 and a device attachment element 14.

The base component 12 includes a housing 16 with a display zone 18, and a clip 20 extending from the bottom of the housing.

The device attachment element 14 includes a connector component 22 and a rigid loop 24 integrally joined with the connector component, the loop defining an aperture 26.

Attached to the connector component 22, adjacent to its opposite ends, are arm straps 28. The arm straps 28, at their ends opposite the ends that are attached to the connector component 22, have releasable attachment means 30 in the form of mating parts of a hook and loop fastener (such as Velcro™).

In other embodiments (not shown), other type of fasteners are used, such as buckles.

The arm straps 28 are for releasably attaching the attachment element 14 to either arm of a user of the device 10. In the preferred embodiment, the arm straps 28 are adapted for attachment to the user's forearm, just below the elbow.

Figures 1, 2, 2A, 3, 4, 5A, 5B, 6A, 6B:
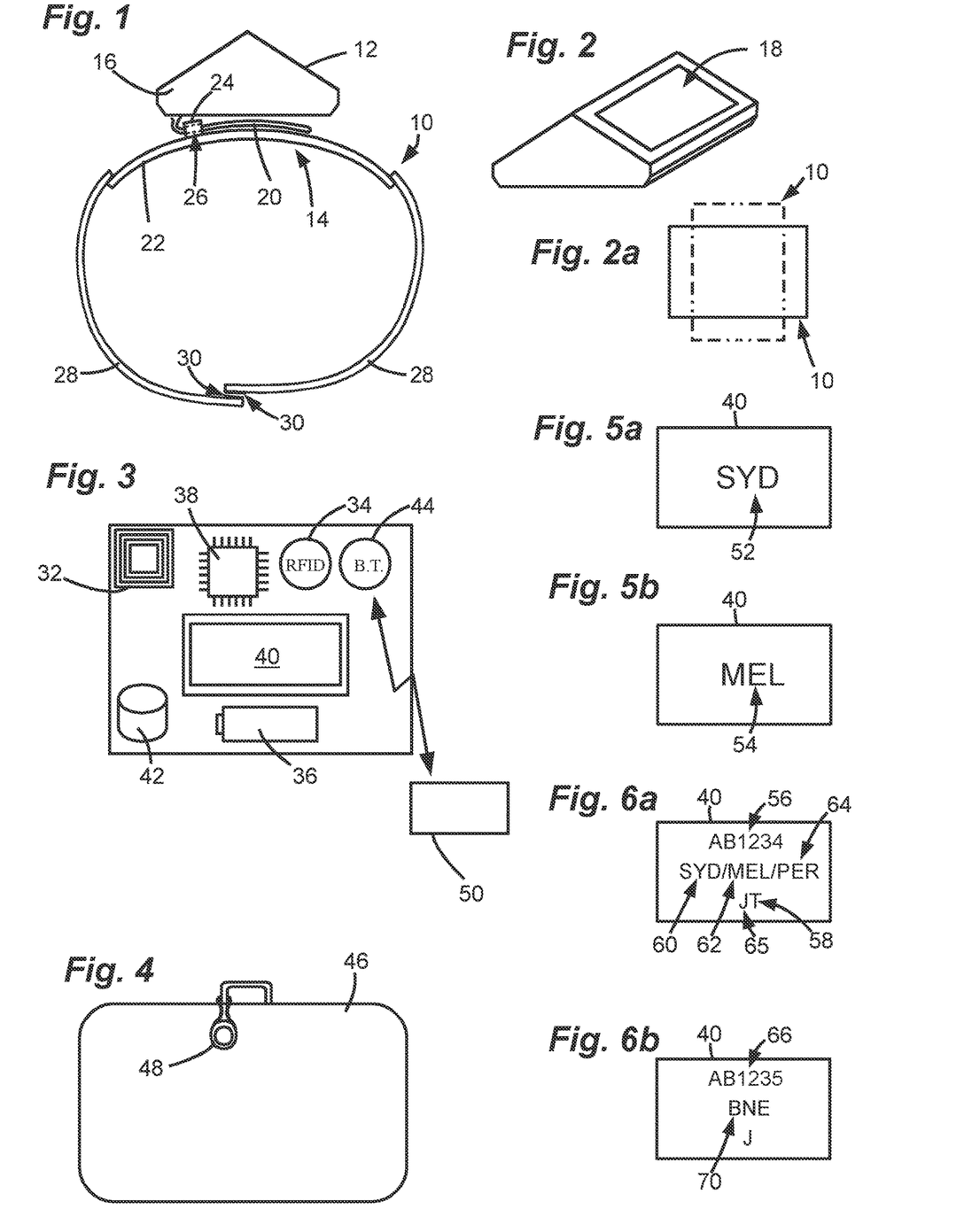
FIG. 1 is a schematic side view of a baggage handling verification device according to an embodiment of the invention.
FIG. 2 is a schematic perspective view of a base component of the device of FIG. 1.
FIG. 2a is a diagrammatic representation showing two possible orientations of a housing of the device of FIG. 1.
FIG. 3 is a diagrammatic view of inner components of the base component of FIG. 2 and a separate storage memory source.
FIG. 4 is a schematic side view of an item of baggage bearing an RFID tag.
FIGS. 5a and 5b are two different representations on a display screen of the device of FIG. 1.
FIGS. 6a and 6b are two further different representations on a display screen of the device of FIG. 1.

As shown in FIG. 1, the clip 20 can be inserted through the aperture 26 in the loop 24 in order to releasably attach the base component 12 to the attachment element 14, and hence to the user's arm when the attachment element is attached to the user's arm by the arm straps 28.

Within the housing 16, the base component 12 includes an RFID antenna 32, RFID reader module 34, a battery 36 (preferably a rechargeable Lithium battery), a micro-controller 38, a display screen 40 which is preferably an LCD screen, and storage memory 42. The display screen 40 is adapted to be aligned with the display zone 18 in the housing 16.

In another embodiment (not shown), the housing 16 is rotatable relative to the arm straps 28 and hence relative to the user's arm when the device 10 is attached to the arm, between the two positions as shown in FIG. 2a. The position shown in solid lines corresponds to that shown in FIG. 1, while the position shown in dashed lines is rotated through 90 degrees relative to the first-mentioned position. This allows the user to select the desired position of the housing 16, and hence of the display screen 40, to facilitate comfortable viewing of the screen by the user.

The manner of attachment of the housing 16 to the remainder of the device 10 in that embodiment is not shown and may be achieved in different ways. For example, the base component 12 may include the housing 16 and the clip 20, while the rigid loop 24, instead of being integrally joined to the connector component 22, may be mounted on the connector component so as to be rotatable relative thereto.

For instance, the formation constituting the rigid loop 24 may include a headed stud which projects into an aperture in the connector component 22 to allow rotation of the stud, and hence of the clip 20 which passes though the aperture 26 in the loop, and of the base component 12 as a whole—including the housing 16, relative to the connector component 22.

The device 10 further includes a wireless reader 44 for receiving wireless signals, which in the preferred embodiments described herein, are of a type compatible with, or which operate according to, the Bluetooth™ standard. In other embodiments, the device and wireless reader may be adapted for use with wireless signals other than the Bluetooth™ standard. However, because the applicable standard according to the preferred embodiment is the Bluetooth™ standard, the wireless reader 44 is referred to herein as the Bluetooth reader.

Programmed into the micro-controller 38 is a software application ("app") adapted to read and process the wireless signals. According to the preferred embodiment the app is adapted to read and process the wireless signals according to the Bluetooth™ standard. Hence, the app is referred to herein as the Bluetooth app.

As discussed in more detail below, the storage memory 42 is used to store information about a particular journey undertaken or to be undertaken by passengers. For convenience, that information as stored in the storage memory 42 is referred to herein as journey information.

Examples of the types of information that may be stored in the storage memory 42 include information signifying identifiers of flights such as a flight numbers; for signifying arrival ports for flights; and for signifying work stations or baggage handling stations (such as particular conveyers) at which passengers' baggage is to be loaded for the journey or journeys or following arrival at destination ports at the end of journeys.

The device 10 may be used by a user, such an airport baggage handler, to determine an appropriate action in relation to a piece of baggage 46, based on tag information stored in an RFID tag 48 attached to that piece of baggage. More particularly, the device 10 may be used to determine whether an intended action by the user in relation to the piece of baggage 46 is appropriate and correct, or not.

Such an intended action may include loading the piece of baggage 46 onto a particular baggage handling system, for example onto a particular conveyor belt or the like.

The user may affix the device 10 to his/her arm by means of the arm straps 28 and then use the device to obtain tag data from the tag 48. According to a preferred embodiment, the device 10 can be actuated by bringing it into proximity to the tag 48.

According to another embodiment (not shown), the device 10 may have an actuation means such as switch or button that can be actuated by the user to actuate the device.

The device 10 is adapted, after being actuated, to receive tag data from the tag 48 by RFID transmission. Signals representing such tag data can be received by the RFID antenna 32 and read and decoded by the RFID reader 34. The received tag data (or at least a portion of that data) can then be compared, by means of the micro-controller 38, with data, representing journey information, stored in the storage memory 42.

According to the preferred embodiment, the journey information is pre-stored in the storage memory 42 before the tag data is received from the tag 48 by the RFID antenna 32.

The journey information is captured for storage in the storage memory 42 by means of the Bluetooth reader 44. This information is obtained from a separate storage memory source 50, which may include a database.

In addition to the information obtained from the separate storage memory source 50, the current date is obtained from the Bluetooth app and stored in the storage memory In another embodiment (not shown), for example where the device 10 does not include the Bluetooth reader 44 and Bluetooth app, the journey information may be hardcoded into the device, or the device may be adapted for the journey information to be manually programmed into the device.

The micro-controller 38 is adapted to compare the received and read tag data (or at least a portion of it) with a corresponding type of data, and possibly other data such as data representing a current date, stored in the journey information.

The micro-controller 38 is also preferably adapted to compare information from the device 10 itself with information included in the journey information, a primary example of which is the current date on the device and a desired baggage handling date in the journey information.

If there is a match in the compared data, the micro-controller 38 is adapted to cause the device 10 to emit a first user-detectable signal (or signals) representing that there is such a match, or a second user-detectable signal (or signals) representing that there is no match.

The first user-detectable signal representing that there is a match, in the preferred embodiment includes green lighting on the display screen 40. The second user-detectable signal representing that there is not a match, in the preferred embodiment includes red lighting on the display screen 40. In a preferred embodiment, the second user-detectable signal representing that there is not a match includes the device 10 vibrating due to a vibration inducing mechanism (not shown) included in the device.

The micro-controller 38 may be adapted to cause signals or indicia representing desired parameters of actions to be taken with the piece of baggage, to be presented on the display screen 40. These may include, for example, a desired destination port for the piece of baggage, the flight identifier or number of the flight on which the baggage is to be transported, whether the baggage is to be sent to the destination port directly or trans-shipped, and/or the desired priority level according to which the baggage is to be handled, such as priority handling in the case of a passenger's Business Class fare or non-priority handling in the case of a passenger's Economy Class fare.

Such parameters as shown on the display screen 40 can be used by the user, for example, to glean certain information that may be applicable in a case of a match having occurred (represented by green lighting) or information that may be the basis for a non-match having occurred (represented by red lighting).

This is illustrated with reference to FIGS. 5a and 5b, and 6a and 6b.

The scenario to which FIGS. 5a and 5b relate, involves one mode of operation of the device 10 according to an embodiment of the invention. This mode is for handling baggage at an arrival port at which baggage is received.

This mode involves setting, in the device 10, the intended destination port for the baggage to be handled by reading the data regarding these types of information from the separate storage memory source 50, using the Bluetooth reader 44 and Bluetooth app. This information is then stored in the storage memory 42 and constitutes the journey information or part of that information.

In the example described with reference to FIGS. 5a and 5b, the data obtained from the separate storage memory source 50 includes data representing the destination port as the city of Sydney.

In this example, the tag data obtained from the RFID tag 48 attached to the item of baggage 46 has data representing the same destination (Sydney), and the date on which the user (baggage handler) is intended to check the tag data, which in turn represents the intended date of arrival of the baggage, that is, the current date.

Thus, according to this example, the destination port and current date contained in the tag data matches the destination port and intended arrival date saved in journey information stored in the storage memory 42, so that there is a match between the tag data and journey information with respect to these items of information.

As there is a match, with reference to FIG. 5a, the micro-controller 38 causes green lighting to be displayed on the display screen 40 and the desired destination port of Sydney, abbreviated by the letters "SYD", to be presented on the screen as indicated at 52.

This indicates to the user that the intended action for the item of baggage 46, for example loading the baggage onto a conveyor allocated for baggage for the particular arrival (destination) port and current date, is correct. This in turn indicates to the user that he or she may proceed to load the baggage onto that conveyor.

In the embodiment described with reference to FIG. 5b, the journey information is the same as that described above with reference to FIG. 5a. However, in contrast to the example described with reference to FIG. 5a, according to the example to which FIG. 5b relates, the tag information obtained from the RFID tag 48 indicates that the destination port for the item of baggage is the city of Melbourne, as opposed to Sydney, while as in the previous example, the destination port as saved in the journey information is Sydney.

Thus, there is a mismatch between the tag data and journey information with respect to the destination port. As there is a mismatch, the micro-controller 38 causes red lighting to be displayed on the display screen 40, and the device 10 to vibrate. In addition, the destination port retrieved from the tag data, namely Melbourne, abbreviated by the letters "MEL" is presented on the screen 40 as indicated at 54.

The user can thus determine, from the red lighting and vibration of the device 10, that the data does not match, but also that the tag data includes the destination port of Melbourne. From this, the user can instantly determine that the reason for the mismatch is due to the tag data representing the another destination port.

The user will thus be alerted by the red lighting not to take the action that was intended for the item of baggage (for example, placing it on the conveyor belt for the flight to Sydney), and will also be informed as to why the mismatch alert was generated. This may assist the user to make necessary remedial arrangements for the baggage item, for example to have it moved to another location where it is supposed to be handled.

The scenarios to which FIGS. 6a and 6b relate, involve another mode of operation according to another embodiment of the invention.

This mode involves setting, in the device 10, the intended flight number for the flight (typically including a flight carrier code plus a number) on which flight the baggage is to be conveyed or has been conveyed. This information is set by reading the data from the separate storage memory source 50 using the Bluetooth reader 44 and Bluetooth app. This information is then stored in the storage memory 42 and is included as part of the journey information in this mode.

In this embodiment, other items of information stored as part of the journey information include the current date, details of the destination port, or ports if it is a multi-leg journey, in which case the baggage will be designated for being trans-shipped.

Indeed, if the baggage is to be trans-shipped, there will be multiple destination ports including the port or ports via which the baggage is to be trans-shipped and the final destination port. If the baggage is not to be trans-shipped, there will only be one destination port, being the final destination port for the baggage In the present example, the relevant data saved as part of the journey information regarding whether the baggage is to be handled as trans-shipped baggage reflects that it is, and that the intermediate destination ports and final destination port are the cities of Sydney, Melbourne and Perth, respectively.

Further in this example, the tag data obtained from the RFID tag 48 attached to the item of baggage 46 has data representing the same flight number, date on which the user is intended to check the tag data (that is, the current date), that the baggage is to be trans-shipped, and the intermediate and final destination ports of Sydney, Melbourne and Perth. The tag data obtained from the RFID tag 48 also includes an indication of the level of priority with which the baggage item 46 is to be handled, for example high priority if the journey of the passenger that owns the item of baggage is Business Class, or normal (lower) priority if that journey of the passenger is Economy Class According to the example to which FIG. 6a relates as described above, these categories of information contained in the tag data (other than the priority), when compared by the micro-controller 38, match those saved in journey information stored in the storage memory 42, so that there is a match between the tag data and journey information with respect to these items of information.

As there is a match, with reference to FIG. 6a, the micro-controller 38 causes green lighting to be displayed on the display screen 40. In addition, the flight number is displayed as well as indicated at 56, together with the letter "T" as indicated at 58, indicating that the baggage is to be trans-shipped.

Also displayed are the intermediate and final destination ports of Sydney, Melbourne and Perth, abbreviated by the letters "SYD", "MEL" and "PER", as indicated at 60, 62 and 64, respectively, and the flight number as indicated at 56.

Another item displayed on the display screen 40 is the letter "J", as indicated at 65, being a code for a Business Class fare for the passenger to whom the item of baggage 46 belongs. Such information emanates from the tag data (in a manner described further below) and is not contained in the journey information as that does not pertain to specific passengers but rather provides general information regarding the journey.

The green lighting and other details on the display screen 40 indicate to the user that the intended action for the item of baggage 46, for example loading the baggage onto a conveyor allocated for baggage from the flight identified by the particular flight number on the current date, is correct. This in turn indicates to the user that he or she may proceed to load the baggage onto that conveyor.

In the embodiment described with reference to FIG. 6b, the journey information is the same as that described above with reference to FIG. 6a. However, in contrast to the example described above with reference to FIG. 6a, according to the example to which FIG. 6b relates, the tag information obtained from the RFID tag indicates that the baggage is not to be trans-shipped, that the flight number is AB1235 as opposed to AB1234 as indicated in the tag data described with reference to FIG. 6a (see at 56 in FIG. 6a), and that the final destination port for the item of baggage is the city of Brisbane.

Thus, there is a mismatch between the tag data and journey information with respect to these items of information. As there is a mismatch, the micro-controller 38 causes red lighting to be displayed on the display screen 40 and causes the device 10 to vibrate. In addition, the flight number and final destination port of Brisbane retrieved from the tag data are presented on the screen 40, as indicated at 66 and 70, respectively, where the final destination, Brisbane, is indicated by the abbreviation BNE.

The fact that tag data reflects that the baggage is not to be trans-shipped is indicated by the absence of the letter "T" as was shown in FIG. 6a.

The user can thus determine, from the red lighting, that the data does not match, but also that the tag data includes the destination port of Brisbane, from which the user can instantly determine that the reason for the mismatch is due to the tag data representing that the baggage is not to be trans-shipped and the tag data indicating the final destination of Brisbane as opposed to the intermediate and final destination ports of Sydney, Melbourne and Perth forming part of the journey information.

The user will thus be alerted by the red lighting and vibration of the device 10 not to take the action that was intended for the item of baggage (for example, placing it on the conveyor belt for the flight to Sydney), and will also be informed as to why the mismatch alert was generated. This may assist the user to make necessary remedial arrangements for the baggage item, for example to have it moved to another location where it is supposed to be handled.

Data captured by the device 10 from the RFID tag 48 may be sent, for example by means of Bluetooth™ transmission, to a suitable receiver at the port at which the baggage is being handled, in order for that data to be used to update that port and/or the airline in relation to which the baggage handling is taking place, of the updated location of the baggage.

The following examples describe ways in which data received from an RFID tag 48 is analyzed and filtered for the purpose of the micro-controller 38 comparing the data with the journey information.

Process for Coding and Decoding Flight Data on the Tag

In this example, a flight code that is to be stored in the tag 48, in ASCII characters, is: KL1930220AMSC.

That code, in binary, is as follows, where the code is shown in 8-bit bytes in a column:
01001011
01001100
00110001
00111001
00110011
00110000
00110010
00110010
00110000
01000001
01001101
01010011
01000011.

Example of Compacting the Code for Storage on the Tag

This code has 104 bits. It can be compacted by deleting the two leading bits from each byte, as follows:
001011
001100
110001
111001
110011
110000
110010
110010
110000
000001
001101
010011
000011.

This leaves 78 bits. However, to be stored on the tag 48, the string of binary code is to constitute ten full 8-bit bytes. In order for the string to have 80 bits to constitute those ten 8-bit bytes, the string can be padded with two 0's at the end, as follows (where the padding 0's are shown in bold):
00101100110011000111100111001111000011001011001011000000000100110101001100001100.

These ten 8-bit bytes constituted by this string and padded 0's is shown in its separate bytes in a column, as follows:
00101100
11001100
01111001
11001111
00001100
10110010
11000000
00010011
01010011
00001100

This is the 10-byte binary string encoded into the tag 48 to represent the desired ASCII code of the flight data.

Decoding of the Data Stored on the Tag

To decode the data stored on the tag 48, the reverse of the above compaction technique may be applied as described below.

The 10-byte binary string encoded into the tag 48 is retrieved. It is shown linearly as follows:
00101100110011000111100111001111000011001011001011000000000100110101001100001100.

The string is then divided into chunks of six bits, resulting in 13 whole chunks, and two leftover bits (the padding 0's). This is shown in a column as follows:
001011
001100
110001
111001

110011
110000
110010
110010
110000
000001
001101
010011
000011
00.

The two leftover padding bits (0's) are discarded.

The original two bits that were stripped from the front of each of these chunks during compaction as discussed above are now re-added to the front of those chunks.

The rule applied in re-adding those bits is described below.

If the most significant byte (MSB) of a particular chunk is "0", concatenate "01" as a prefix to the chunk. If the MSB of a particular chunk is "1", concatenate "00" as a prefix to the chunk. The result of this process is as follows where the chunks with their concatenated prefixes, are as shown in a column as follows:

01001011
01001100
00110001
00111001
00110011
00110000
00110010
00110010
00110000
01000001
01001101
01010011
01000011.

The above 13 8-bit bytes constitute the original 104-bit binary code representing the ASCII flight data. This string can be re-converted to ASCII characters as follows: KL1930220AMSC.

Storage of the Compacted Code and Other Information in the Tag

The compacted binary code (prior adding back the leading characters above, and prior to discarding the two padding 0's) is stored on the tag 48 in that binary format together with other information. The significance and usage of some of that other information may be considered in terms of the Hexadecimal representation of that information and of the above compacted code, as the manner in which that code is processed is based on the Hexadecimal representation.

Indeed, the tag 48 includes data representing 42 bytes of Hexadecimal information. Of those 42 bytes, while the 10 MSBs of tag code constitute a Permanent Baggage Tag (PBT) Number, the 12 LSBs of tag code constitute (in Hexadecimal format) the combination of the above-mentioned additional information and of the above-mentioned 104-bit binary code (which in turn represents the above ASCII flight code).

The Hexadecimal representation of that additional information together with the compacted version of the original 104-bit binary code in Hexadecimal format is as follows: 460A2CCC79CF0CB2C013530C.

In this string, the additional information is constituted by the two MSBs, namely 46 and 0A, where:

46 is International Air Transport Association (IATA) Hexadecimal code for flight data, and 0A is the Hexadecimal equivalent of the decimal number 10, indicating that following ten bytes represent the flight data.

Thus, when the relevant binary data representing that Hex string is read by the RFID reader 34 from the tag 48 and converted into, and considered in, its Hexadecimal format, it informs the device 10 firstly that the data being read includes the appropriate IATA code for flight data, and therefore that the flight data in that code may be treated as proper flight date.

Secondly, it informs the reader 34 that the flight data is constituted by the next ten bytes of Hex code.

Thus, of the above Hex string, the Hexadecimal representation of the flight data as compacted and stored in the tag 48 (following the two MSBs) is as follows: 2CCC79CF0CB2C013530C.

Analysis of the ASCII Flight Data

In the above examples, the ASCII character flight data stored in compacted form in binary format on the tag 48, and which is derived from the above decoding process, is "KL1930220AMSC". The portions of that string are explained as follows:

KL is carrier code 1930 is flight number 220 denotes the day of the year using annual Julian-type dates calculated from the beginning of the particular year so that 220 represents the 8th August as it is the $220^{th}$ day of the year on a non-leap-year year.

The next 3 characters represent the destination city name using international airport codes. Thus, those 3 characters, "AMS" represent Amsterdam.

The last character represents the travel class. The characters used by different airlines to denote flight classes may differ. In this present example, the letter "C" is used. In other examples used herein (see below), the letter "J" is used to denote Business Class, while the letter "Y" is used to denote Economy Class.

If multiple flights are involved, that is, in a situation where baggage is to be handled on a trans-shipped basis, with a maximum of three possible flight legs, then the same string format as the raw hex string above will be repeated for each flight in addition to the first, and concatenated to the end of that first string in the case of two flights, or to the already-concatenated string in the case of three flights.

Each one of the concatenated strings will include data which, when analyzed as discussed above, will represent the three-character airport code for the particular destination to which that string relates.

Hence, of the fully concatenated string, the relevant twelve LSBs will represent the final destination, the next twelve relevant bytes (if starting with the Hex digits 460A—where, as discussed above, "46" represents the IATA code for flight data and "0A" indicates that the following 10 bytes represent flight data) will represent the first connecting destination if there are a total of two destinations or the second connecting destination if there are a total of three destinations. If there are a total of three destinations, there will be a next string of twelve bytes which (again, if starting with the Hex digits 460A) will represent the first connecting destination.

Of the string converted to ASCII characters, the digits representing the carrier code and flight number (collectively, the first six characters) together with the destination port (city) and class (collectively, the last four characters) are stored as a string in a list, which, in the present example is titled "FlightList". Reference to "FlightList" below is a reference to that list.

Thus, of the above string converted to ASCII characters, the new string created in this manner will be "KL1930AMSC", referred to below as the "flight data string".

FlightList will be three entries long (with sequential positions identified as positions 0, 1 and 2) and will be populated in order from the third entry to the first entry. For example, the final destination will be stored at the third entry position, 2, with the first and second positions, 0 and 1, being optional. Thus, where it is a one-leg journey, the third position in the list will be populated, with the other two positions remaining empty. If is it is a three-leg journey, the other two positions will be populated with the relevant data for those legs of the overall journey.

When baggage (for example the item of baggage 46) is being handled at a particular port, the micro-controller 38 will compare the current port as stored as part of the journey information in the storage memory 42, with the destination port as represented by the 7th to 9th characters of the flight data string under consideration (which in the above example are "AMS", representing the city of Amsterdam). The current port as stored as part of the journey information, which would have been obtained from the separate storage memory source 50 should, of course, be the port at which the baggage handling is taking place.

This comparison process will start with the third position (position 2) in FlightList. If no match is found in relation to destination port, the comparison process will move to the second position in FlightList (position 1), and if no match is found there, will move to the first position FlightList (position 0).

The process of comparing and moving to the second or first positions will continue until a match or null is found, where null is where there is no data at the relevant position, that is, an empty string.

If a match or null is found in a flight data string at any position other than the first position (0), then that flight data string and all the entries (if any) at lower-numbered positions relative to the position of that flight data string, are deleted.

The above may be illustrated by the following examples pertaining to three-leg journey.

Example 1

In this example, the above comparison process is carried out at the first destination port of the journey. Thus, it is likely that a match will be found at the first position in FlightList, namely position 0.

Once the comparison indicates a match for that string for the particular destination port, the string in FlightList list containing the identifier for that port (in the present example, position 0) is no longer required, as the discovered match will trigger the process for causing the device 10 to indicate to the user that the match has been found (as discussed further below), and that string is deleted.

The remaining strings in FlightList will be those at the second and third position, namely positions 1 and 2, signifying the second and final destination ports.

Example 2

In this example, the above comparison process is carried out at the second destination port of the journey. Thus, it is likely that a match will be found at the second position in FlightList, namely position 1.

Once the comparison indicates a match for that port, the string in FlightList containing the identifier for that port (in the present example, at position 1) is no longer required, as the discovered match will trigger the process for causing the device 10 to indicate to the user that the match has been found (as discussed further below), and that string is deleted.

In addition, in the present example, the string at the first position in FlightList list, namely position 0, if not already deleted, will no longer be needed as that relates to a previous leg (port) of the journey. Therefore, that string, if not already deleted, is now deleted.

The only remaining string in FlightList will be that at the third position, position 2, signifying the final destination port.

Following the above process, FlightList shows all upcoming flight destinations in a sequenced order if there is more than one. The first flight destination found in the FlightList (in order from the first to third entries—namely positions 0, 1 and 2) will be the next destination port.

Output to the Device

Figure 7:
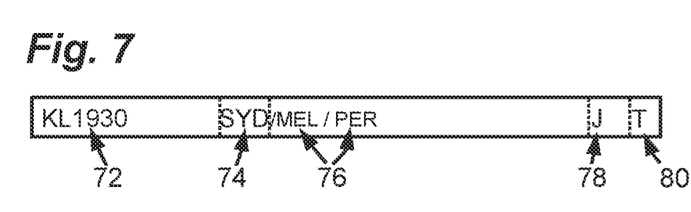
FIG. 7 is a representation of a display on the display screen of the device of FIG. 1 according to another embodiment of the invention.

The process of constructing the output of the device 10, to be displayed on the display screen 40, is set out below, where, in the preferred embodiment, the output is represented on the display as a single row of characters as illustrated in FIG. 7. This output is derived from the flight data strings in FlightList.

From the next sequential flight data string in FlightList, the next destination port's flight carrier code and flight number (e.g. KL1930) are determined from the first six characters of that string. This is stored as a variable, "NextFlightNum", on the device 10, and can be suitably formatted for display (for example in terms of the font to be used, color of presentation, and so on). Such a display is indicated at 72 in FIG. 7.

The 7th to 9th characters (three characters in total) are then read from the flight data string relating to the next destination port and are stored as a variable, "NextDestination", on the device 10. For example, if the next destination port is the city of Sydney ("SYD"), then the "NextDestination" is saved as "SYD" for display on the display screen 40 as indicated at 74 in FIG. 7.

If there is one further flight data string in FlightList, indicative of one further destination port in the multi-leg journey, the 7th to 9th characters of that string are saved as a variable, "FutureDestinations" on the device 10.

If there is more than one further flight data string, indicative of more than one further destination port in the multi-leg journey, the 7th to 9th characters of each of those remaining flight data strings in FlightList are concatenated, in sequential order, and saved as a single string as the variable "FutureDestinations" on the device 10.

For example, if there is one remaining flight data string in FlightList (indicating that there is one further destination port in the journey), and if that port is the city of Melbourne ("MEL"), the part of the remaining flight data string representing that port can be saved as the variable "FutureDestinations" in the following format: "/MEL".

If there is are two remaining flight data strings in FlightList (indicating that there are two further destination ports in the journey), and if those ports are the cities of Melbourne ("MEL") and Perth ("PER"), the parts of the respective flight data strings in FlightList representing those two ports can be saved as the "FutureDestinations" variable in the following format: "/SYD/MEL". This may be displayed on the display as indicated at 76 in FIG. 7.

The last character in the flight data string for the next port, following the three characters representing the location at which the baggage handing is taking place (i.e. the current port), is stored in a variable called "TravelClass", for example as "J" indicative of Business Class and "Y" indicative of Economy Class. This may be displayed on the display as indicated at 78 in FIG. 7.

If there are multiple flight data strings in FlightList, indicating multiple remaining destination ports in the journey, then a variable, "IsTransit" is set to True. If IsTransit is set to True, then the letter "T" (for transit) will be displayed at the end of the row, as indicated at 80 in FIG. 7.

The names of the above variables are provided by way of example only.

An advantage of the present invention as described above is that the device 10 is attached to the user's arm in a way that keeps the user's hands free, for example to handle baggage. The user may thus be able to avoid the inconvenience of having to move the baggage to a pre-installed, stationary reader for reading the RFID tag, or to have to pick up a separate reader from a support such as a cradle or the like, for reading the RFID tag after which such reader would have to be returned to the support.

A further advantage is that, in one preferred embodiment, components of the device 10 such as the RFID reader module 34, micro-controller 38, display screen 40 and wireless reader 44 are all part of one integrated unit. This can also assist in reducing inconvenience to the user that might otherwise occur if the user were required to use more than one device to read the baggage tag and have appropriate signals provided to the user, such as colored lighting and indicia such as items of text. Such a scenario might occur, for example, if the user were required to use a separate reader to read the RFID tag, and have the signal or signals generated on yet a further separate device such as a mobile phone.

Figure 8:
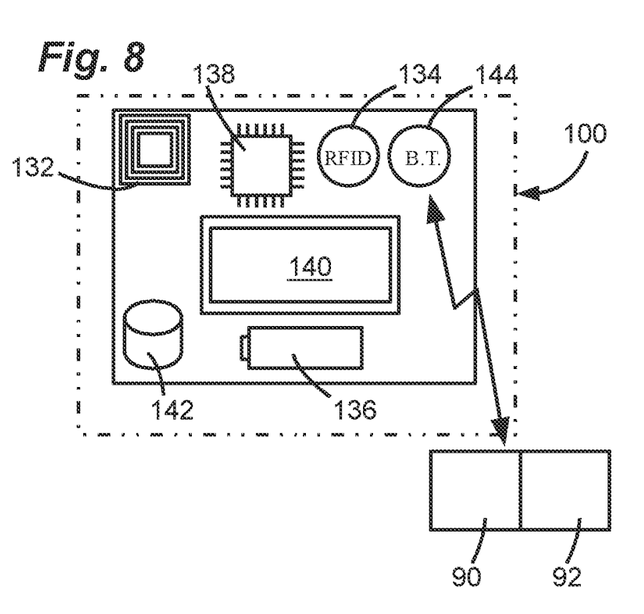
FIG. 8 is a diagrammatic view of inner components of the base component of a device according to a different embodiment to that of FIG. 1 and a remote receiver and transmitter.

According to another aspect of the invention, there is provided a device 100 shown diagrammatically in dashed lines in FIG. 8. The device 100 has similar components to the device 10 as described above, except for differences as follows. Components described in relation to the device 10 that are present in the device 100 are referred to by the same reference numerals as in the device 10, except for the prefix "1".

The device 100 has a wireless reader 144 which also serves as a wireless transmitter and is adapted not only for receiving wireless signals from a remote wireless transmitter 90 but for transmitting wireless signals to a remote wireless receiver 92. Hence, the wireless reader 144 is referred to below as a wireless reader/transmitter.

The remote wireless transmitter 90 and remote wireless receiver 92 may form part of a single wireless transmitter and receiver.

In use, The RFID device 100 is adapted to read data from the baggage tag 48 containing a unique identifier of the tag. The wireless reader/transmitter 144 then sends data representing that identifier to the remote receiver 92.

The wireless reader/transmitter 144 then receives a response signal from the remote transmitter 90.

The micro-controller 138 of the device 100 then generates at least one user detectable signal based on the content of the response signal from the remote transmitter 90.

This functionality is useful not for the purpose of verifying and comparing data on the tag 48 with data in the journey information as in the case of the device 10, but for alerting the user of the device 100 to situations or facts as reflected in the response signal from the remote transmitter 90.

As in the case of the device 100, the user detectable signals caused by the micro-controller 38 to be generated by the device may include color lighting generated on the display screen 140, indicia such as text and words, and vibration.

An example of such use is where a particular passenger's baggage has been assigned for being loaded onto an airplane or has already been loaded, but for some reason the passenger is not and will not be present on the flight. In such a case it may be desirable for the passenger's baggage to be removed and returned to the passenger or held for return to the passenger.

When a user wearing the device 100 is in proximity to the RFID tag 48 on that passenger's baggage, the RFID reader 134 will be activated by such proximity and retrieve data from the tag, the data including the tag's unique identifier.

The wireless reader/transmitter 144 will then transmit data representing that identifier to the remote receiver 92.

The remote receiver 90 and transmitter 92 form part of a data handling system (not shown—for example of an airport or airline) and may be pre-programmed or pre-loaded with data pertaining to that tag. In the present example, that data reflects the situation that the passenger will not be on the flight. That system will then cause the remote transmitter 92 to send a predetermined signal or signal type for reflecting that situation.

When the wireless reader/transmitter 144 receives the signal from the remote transmitter 90, the micro-controller 38 is adapted to cause the device 100 to generate the appropriate user-detectable signals, which are selected from a plurality of predetermined signals, based on the particular situation represented by the signal from the remote transmitter. For example, for the particular situation described, the detectable signals include purple lighting on the display 140 and vibration of the device 100.

In a preferred embodiment, a single device (not shown) includes the componentry of the devices 10 and 100 as described above, and such device is thus adapted to perform the functionalities of those devices 10 and 100 as described.

Although the invention is described with reference to specific embodiment above, it is not limited to those embodiments but may be embodied in many other forms as limited only by the claims.

For example, while the above examples indicate that the signal issued in the event of a match between the tag data and journey information include green lighting on the display screen 40, other colors may be used instead (preferably not red which is preferably reserved for a non-match situation). For example, a different color, say purple, may be used where there is a match and the baggage is to be handled on high-priority basis. That color can quickly and at a glance alert the user to that priority basis without the need to note the relevant indicia on the screen pertaining to that priority.

Also, while the invention is described in relation to journeys involving flights, it may apply to journeys using other modes of transport, such as road transport, rail transport or transport on water.

The invention claimed is:

1. A baggage handling verification device for use with baggage to which is fixed an RFID baggage tag containing data, the device including:
   a device user interface adapted to emit user-detectable signals;
   at least one device attachment element adapted to releasably attach the device to a part of the body, other than the hands, of a user of the device;
   an RFID signal receiving antenna;

an RFID reader adapted to read data received by the antenna from the tag, that data representing first information;

data memory, storing data representing second information pertaining to a predetermined passenger journey; and a CPU adapted
- to compare the first information represented by data read by the RFID reader with the second information stored in the data memory,
- to determine if the compared first information and second information match each other,
- to cause the user interface to emit at least one first predetermined user-detectable signal indicative of the compared first information and second information matching each other, and
- to cause the user interface to emit at least one second predetermined user-detectable signal indicative of the compared first information and second information not matching each other.

2. The baggage handling verification device of claim 1 wherein the at least one device attachment element includes an arm strap adapted for attachment of the device to the user's arm.

3. The baggage handling verification device of claim 1 wherein the device user interface includes a display screen.

4. The baggage handling verification device of claim 3 wherein the user-detectable signals include a plurality of differently colored visible signals.

5. The baggage handling verification device of claim 3 wherein the at least one first predetermined user-detectable signal includes lighting of a first color and the second at least one predetermined user-detectable signal includes lighting of a second color, different to the first color.

6. The baggage handling verification device of claim 1 wherein the user interface includes a vibration generator adapted to cause the device to vibrate.

7. The baggage handling verification device of claim 1 wherein the user-detectable signals include text symbols.

8. The baggage handling verification device of claim 1 including a wireless signal reader for reading the data representing the second information, from a separate data source.

9. The baggage handling verification device of claim 8 including a software application for manipulating said data read from the separate data source.

10. The baggage handling verification device of claim 9 wherein the software application is adapted for manipulating said data read from the separate data source, where that data has been received from said separate source according to the Bluetooth™ Standard.

11. A method of determining whether an intended action relating to an item of baggage, to which is fixed an RFID baggage tag containing data, matches a predetermined desired action relating to that baggage item, the method including:

determining an intended action relating to the baggage item;

providing a baggage handling verification device, the device including:
- a device user interface adapted to emit user-detectable signals;
- at least one device attachment element adapted to releasably attach the device to a part of the body, other than the hands, of a user of the device;
- an RFID signal receiving antenna;
- an RFID reader adapted to read data received by the antenna from the tag, that data representing first information;
- data memory that stores data representing second information pertaining to a predetermined passenger journey; and
- a CPU adapted
  - to compare the first information represented by data read by the RFID reader with the second information stored in the data memory,
  - to determine if the compared first information and second information match each other,
  - to cause the user interface to emit at least one first predetermined user-detectable signal indicative of the compared first information and second information matching each other, and
  - to cause the user interface to emit at least one second predetermined user-detectable signal indicative of the compared first information and second information not matching each other;

releasably attaching the device to the body of a device user with the at least one device attachment element such that the device is attached to a part of the body other than the hands of the user;

providing the baggage item, wherein the RFID baggage tag containing data representing first information is attached to the baggage item;

causing the RFID signal receiving antenna to receive, from the tag, said data representing first information;

causing the RFID reader to read the data representing first information, received by the antenna from the tag;

causing the CPU
- to compare said first information represented by data read by the RFID reader with the second information represented by the data stored in the data memory,
- to determine if the compared first information and second information match each other,
- to cause the user interface to emit at least one first predetermined user-detectable signal if the compared first information and second information match each other, and
- to cause the user interface to emit at least one second predetermined user-detectable signal, different to the first predetermined user-detectable signal, if the compared first information and second information do not match each other; and carrying out the intended action relating to the baggage item if the user interface emits the at least one first predetermined user-detectable signal; and carrying out another action if the user interface emits the at least one second predetermined user-detectable signal.

12. The method of claim 11 wherein said step of causing the CPU is effected, at least partially, by moving the device into proximity to the tag.

* * * * *